United States Patent [19]

Pedersen

[11] Patent Number: 4,896,711
[45] Date of Patent: Jan. 30, 1990

[54] APPARATUS FOR MOUNTING AND DISMOUNTING OF TIRES

[76] Inventor: Ejnar Pedersen, Bryndumvej 205, Esbjerg, Denmark, 6715

[21] Appl. No.: 247,862

[22] Filed: Sep. 22, 1988

[30] Foreign Application Priority Data

Oct. 5, 1987 [DK] Denmark .............................. 5204/87

[51] Int. Cl.⁴ ........................ B60C 25/07; B60C 25/10
[52] U.S. Cl. .................................................. 157/1.22
[58] Field of Search ...................... 157/1.17, 1.1, 1.22, 157/1.24, 1.3

[56] References Cited

U.S. PATENT DOCUMENTS

| | | | |
|---|---|---|---|
| 1,442,649 | 1/1923 | Cattoni ................................. | 157/1.22 |
| 2,900,017 | 8/1959 | Lewis .................................. | 157/1.22 |
| 3,818,967 | 6/1974 | Dunn ................................... | 157/1.22 |
| 4,425,954 | 1/1984 | Ogren .................................. | 157/1.22 |

FOREIGN PATENT DOCUMENTS

| | | | |
|---|---|---|---|
| 877413 | 7/1953 | Fed. Rep. of Germany ..... | 157/1.22 |
| 288313 | 9/1931 | Italy .................................... | 157/1.22 |

Primary Examiner—D. S. Meislin
Attorney, Agent, or Firm—Fleit, Jacobson, Cohn, Price, Holman & Stern

[57] ABSTRACT

An apparatus for mounting and dismounting of tires based on the principle of a wedge-shaped tire lever forced in between the wheel rim and bead wire of the tire in order to force the bead wire inside or outside the rim by a relative movement along the edge of the rim, has a double set of tire levers (5) which by the use of associated rim gripping or damping devices (6, 7) on the ends of pivoted arms which are pivoted outwardly and inwardly by a main piston cylinder and linkage advance stepwise along the rim edge (K) by alternate activation of the rim clamps, the distance between the two tire levers being increased and reduced forcibly at the same time so that the tire levers work on the entire wheel rim circumference. The apparatus is operated by compressed air and a manually operated directional valve controls the working rate. The apparatus is mobile and can be carried and operated by a single person and requires no adjustment.

14 Claims, 2 Drawing Sheets

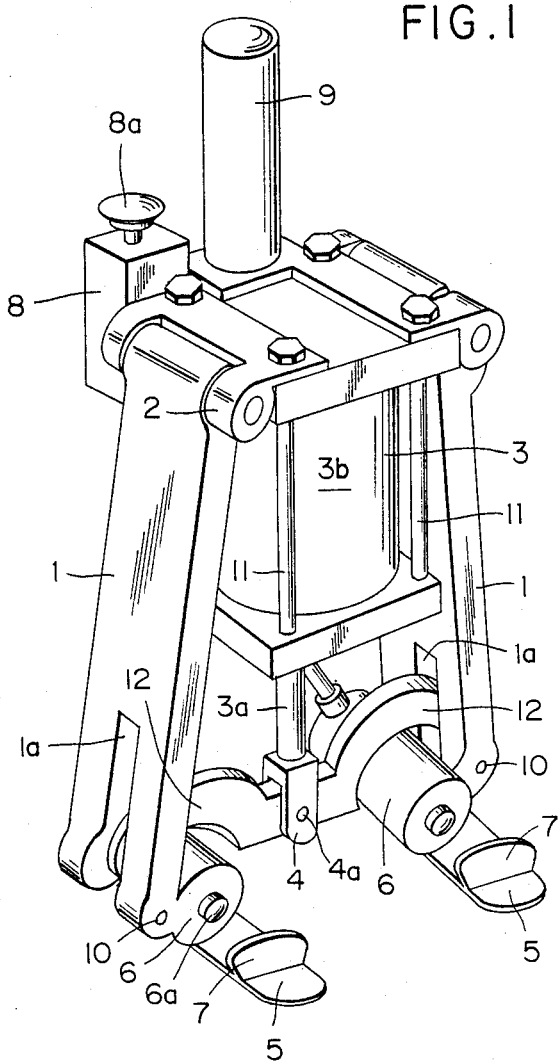
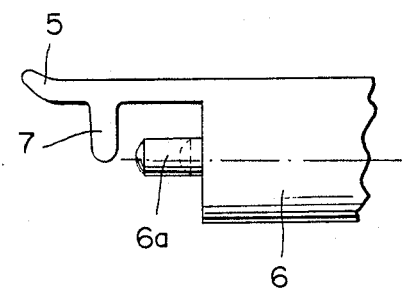
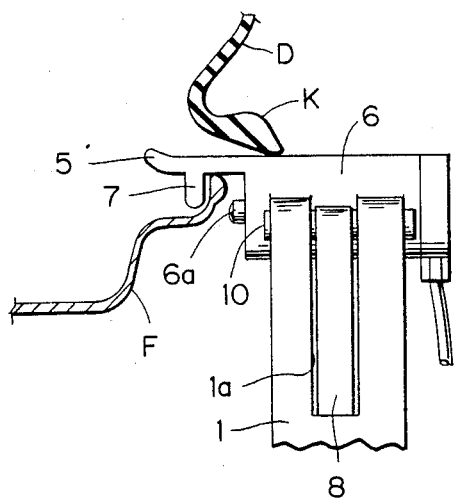
FIG.1
FIG.4
FIG.5

APPARATUS FOR MOUNTING AND DISMOUNTING OF TIRES

BACKGROUND OF THE INVENTION

1. Field of The Invention

The invention relates to an apparatus for mounting and dismounting tires, and more particularly to such an apparatus of the type wherein a wedge-shaped device is forced in between the rim edge and the bead wire of the tire to force the bead wire inside or outside the rim edge by a relative movement along the rim edge.

2. Description of The Prior Art

In a prior art apparatus for mounting and dismounting of tires the wheel is fixed to a horizontal shaft resting on an adjustable machine frame. During slow rotation the tire bead is machined by means of a bead wire tool designed for this purpose, either in the form of a wedge-shaped chisel or a rotatable pressure plate depending on whether the tire is to be mounted or dismounted. The bead wire tool is mounted on an adjustable arm on the machine frame. To fix the wheel to the shaft, the latter is provided with a universal chuck which by means of a number of radial claws or arms can be set to different wheel diameters and rim shapes.

The apparatus is designed for stationary set-up in a garage so that in any case a change of tire or mending of a puncture will require that the wheel is dismounted from the vehicle and brought to the garage. Mobile use of the apparatus is not possible. In many cases it will, however, be both faster and, from a working point of view, more practical if tire change or puncture mending could be carried out locally, especially in the case of large unhandy wheels such as tractor wheels, construction machinery wheels and lorry wheels.

BRIEF SUMMARY OF THE INVENTION

It is an object of this invention to remedy defects in prior art devices by providing a mobile, very handy apparatus which allows mounting work directly on the spot while the wheel is fixed to the vehicle, or has been dismounted.

The apparatus according to the invention is characterized by having a double set of tire levers which by the use of two associated squeezing devices clamping directly on the rim edge 'step' along the rim, i.e. move step by step, by opening and closing the two squeezing devices alternately, the distance between the tire levers being increased and reduced alternately at the same time. During this stepwise movement the tire levers advance around the rim between the rim edge and the bead wire causing the bead wire to be forced outside the rim when the tire is to be dismounted.

The apparatus fits all wheel sizes directly and can be conveyed everywhere, e.g. on a service van. The apparatus is fast and uncomplicated to use. The apparatus can be arranged expediently for pneumatic operation as compressor equipment is available or brought along wherever tires are serviced.

An embodiment of the invention as described results in a very compact structure of the apparatus and also a constructional solution containing as few parts as possible. Building the main cylinder into the claw mechanism such as provided in one embodiment also gives optimum utilization of the cylinder force.

The various movements of the apparatus (cylinders) is performed expediently by means of a central control valve common to both the main cylinder and squeeze cylinders. The control valve is designed for manual operation and give the operator a valuable sense and control of the movements of the apparatus. This solution is also simple and reliable. The control valve is mounted directly on the apparatus.

As an alternative to the manually operated control valve, the apparatus can be arranged with valve equipment for automatic sequential control of the various movement functions.

BRIEF DESCRIPTION OF THE DRAWINGS

The invention will now be described in detail with reference to the accompanying drawing wherein:

FIG. 1 is a perspective view of a tire mounting and dismounting apparatus according to the invention;

FIG. 4 is a detail view of the squeeze device; and

FIG. 5 is an enlarged schematic cross-sectional view showing the function of one tire lever and the associated squeeze mechanism during dismounting of a tire.

DETAILED DESCRIPTION

Figure 2:
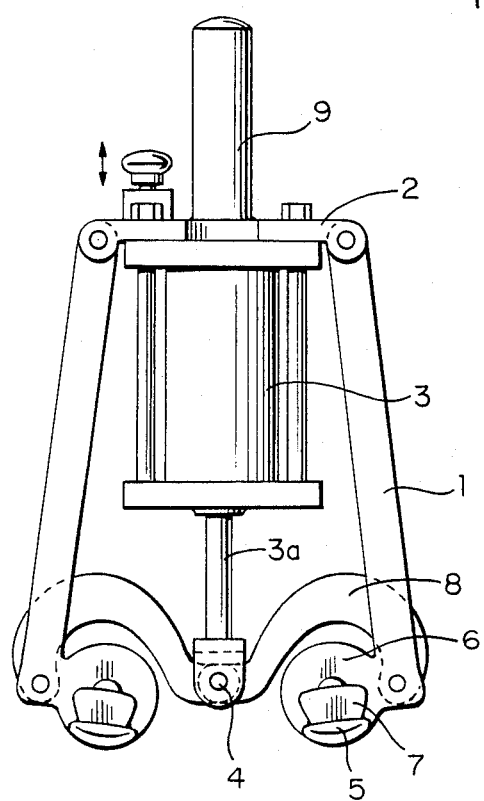
FIG. 2 is a front elevational view of apparatus in the simplified version of FIG. 1, with the claw mechanism shown in an open position.

In the embodiment shown on the drawing the tire mounting apparatus mainly consists of a claw-shaped mechanism including two claw legs 1 with associated hinge parts 2 at one end, a pneumatic cylinder (main cylinder) 3 built in between the claw legs with a piston rod 3a having a forked end 4, a tire lever 5 fixed and extending at right angles to the free end of each claw leg, and a gripper cylinder 6 connected to each tire lever and having a holder or gripper member 7. The apparatus also includes a pneumatic control valve 8 common to the three cylinders 3 and 6 and a rear handle 9 (i.e. extending away or outwardly with respect to the tire levers).

Figure 3:
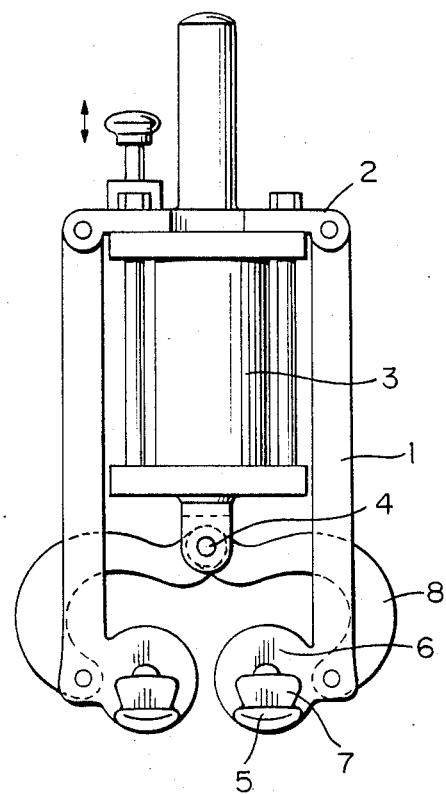
FIG. 3 is a view similar to FIG. 2 of the same apparatus in a closed position.

The main cylinder 3 actuates the claw legs 1 via an angle joint mechanism consisting of two angle joints 12 fitted between the forked end 4 and the legs 1. The angle joints are each pivotally connected at one end by a common joint pin 4a to the forked end 4. The claw legs have slits 1a in which the angle joints operate and have pivot joint connections at the other ends to the legs indicated by joint pins 10. When the piston rod 3a moves out of the cylinder the angle joints force the two legs 1 to move away from each other (FIG. 2) and when the piston rod is retracted legs 1 are drawn together (FIG. 3).

The hinges 2 of the claw legs are bolted to the outside of the bottom part 3b of the main cylinder by means of the stay bolts 11 of the cylinder. The hinges 2 form the swivel bearings of the legs 1.

The gripper cylinders 6 and the tire levers 5 are designed as integrated units welded to the ends of the claw legs. The tire lever 5 is an extension from the cylinder 6 parallel to the piston rod 6a, but at some distance from it. On one side of the tire lever 5, at some distance in front of the piston rod 6a, a rounded angularly projecting gripper nose 7 is welded and together with piston rod 6a, forms the holder or gripper operated by cylinder 6. The tire lever gripper nose and cylinder piston rod are adapted to be positioned in use with respect to the rim profile as shown in FIG. 5.

Activation of the gripper cylinder 6 forces the piston rod 6a towards the rim F which is then held firmly between the holder or gripper member and the piston rod 6a which together function as a claw at the end of each leg 1. In this way, the lever 5 on cylinder 6 is locked in position on the rim. When the pressure in cylinder 6 is released again (each cylinder being a single action cylinder with a spring return, not shown), the tire lever is released from the rim. This operation of each gripper is out of phase, or "alternated with the other gripper and also synchronized with the reciprocating movement of the main cylinder 3 so that in this way the tire levers are made to 'crab', or crawl, forward on and around the rim. During this movement the two tire levers cause the bead wire K of the tire D to be forced away from the rim (as shown in FIG. 5), and depending on whether the bead wire is forced out or in relative to the rim, the tire is dismounted and mounted respectively. The tire can be guided sideways by manual efforts. In the working position the handle 9 of the apparatus points radially with respect to the wheel center.

A more detailed description of the operation of the apparatus will now be given. In this description it is assumed that one having ordinary skill in the art knows that each wheel, particularly when mounted on the vehicle, has an inner rim H and an outer rim K and the tire has a corresponding inner bead J and outer bead K. For dismounting a tire, levers 5 are inserted between the outer rim F and outer tire bead K preferably when in the close position (FIG. 3) so that gripper elements 7 are inside of rim F and part of bead K is on the outer surface of levers 5 as shown in FIG. 5.

Then one of the gripping cylinders 6 is operated by control valve 8 so that piston rod 6a thereof is moved outwardly into engagement with the outside of rim F to clamp rim F between the outer end of the piston rod and gripper member 7 to securely clamp one claw leg 1 to the rim. At this time the other gripper cylinder is not pressurized and the piston rod thereof is in the retracted position, whereby operation of main cylinder 3 by control valve 9 spreads the grippers apart (FIG. 2) by moving the unclamped gripper away from the clamped gripper. During this movement lever 5 traverses under bead K and forces it off of rim F at least for the distance lever 5 travels around the rim in this step. After reaching its outer spread position, the gripper just moved is operated by the control valve 8, as described above, to clamp onto the rim and the other gripper is released from the rim by releasing the pressure in the cylinder 6 thereof, whereupon operation of main cylinder 3 by control valve 8 in the opposite direction draws claw legs 1 together moving the just released gripper towards the clamped gripper to the inner position (FIG. 3). Continuous step by step operation as described above incrementally moves the gripper and levers 5 thereof around rim F until the entire bead K is removed from the rim. A part of the other, or inner, bead J of the tire is then slipped over levers 5 and stepwise operation described above is again commenced to completely remove the tire from the wheel.

When the tire is to be mounted, levers 5 (preferably in the position of FIG. 3) are positioned against the inner surface of the inner bead J of the tire and gripper member 7 is hooked over the inside of outer rim F. The apparatus is then operated in the stepwise fashion described above until the inner bead is completely forced over rim F into the wheel area between the inner and outer rims. Levers 5 are then positioned against the outer surface of the tire over bead K and pushed inwardly toward the inner bead J until gripper members 7 are hooked over the inside of rim F and the outer bead portion is in the relative position shown in dashed line in FIG. 5. The stepwise operation described above is then commenced until the entire circumference of bead K is inside rim F at which time gripper members 7 and levers 5 are removed from the rim and the apparatus is thereby separated from the wheel and tire assembly.

From the above description it will be clear that the apparatus is readily usable and capable of dismounting a tire from its fully mounted position and for mounting a tire from its fully dismounted position.

The three cylinders (main cylinder 3 and gripper cylinders 6) are connected to a common 5/2 directional valve 8 mounted on the side of the main cylinder (FIG. 1). The valve has a handle 8a for manual operation. The apparatus has a relative weight and can be operated by a single person. The apparatus requires connection to a compressed air supply.

It will be understood that the leading principle of the present invention lies in the tire levers and their associated gripper mechanisms which can mount and dismount tires while being propelled around the rim.

I claim:

1. An apparatus for mounting and dismounting a tire having circumferential beads from a wheel having circumferential rims against which the beads engage respectively in use comprising:
   a main actuator means;
   first and second gripper means for clamping onto a rim and mounted on said main actuator means for movement relative to each other;
   a tire lever means on each of said gripper means for engagement with a tire adjacent a bead thereof; and
   control means for operating said main actuator means and said gripper means in sequence so that said first gripper means is actuated to clamp onto the rim, said main actuator means is actuated to move said second gripper means relative to said first gripper means in a first direction, said second gripper means is actuated to clamp onto the rim, said first gripper means is deactuated to release the rim therefrom, said main actuator means is actuated to move said first gripper means in said first direction, said first gripper means is actuated to clamp onto the rim, and said second gripper means is deactuated to release the rim therefrom, said sequence being repeated as desired.

2. An apparatus as claimed in claim 1 wherein:
   said main actuating means comprises a double acting fluid pressure operated main cylinder-piston means having a main piston rod; and
   said gripper means each comprises a fluid operated gripper cylinder-piston means, a piston rod having an outer gripper end on the piston of said gripper cylinder-piston means, and a gripper member between said outer gripper end and said tire lever means on the respective gripper means cooperating with said gripper end for clamping the rim between said gripper member and said gripper end.

3. An apparatus as claimed in claim 2 wherein said main actuating means further comprises:
   two leg members each pivotally mounted in relative spaced relation on the cylinder of said main cylinder-piston means;

one of said gripper means being mounted on each of said leg members in spaced relation to the pivotal mounting thereof;
an outer end on said main piston rod; and
a pivoted linkage means between said outer end of said main piston rod and said leg members so that actuation of said main cylinder piston means to move said main piston rod outwardly pivots said leg members and said gripper means thereon apart and actuation of said main cylinder-piston means to retract said main piston rod pivots said leg members and said gripper means thereon toward each other.

4. An apparatus as claimed in claim 3 wherein said linkage means comprises:
a pivot member on said outer end of said main piston rod; two link members each pivotally connected at one position thereon to said pivot member and pivotally connected at a position spaced from said pivot member on a respective one of said leg members.

5. An apparatus as claimed in claim 4 wherein:
a slot is provided through each leg member; and
said link members each extend through a respective one of said slots.

6. An apparatus as claimed in claim 2 wherein:
said gripper cylinder-piston means are mounted on a respective leg member so that the gripper piston rods thereof move relatively to said gripper cylinders in a direction transverse to the first direction of movement of said gripper means.

7. An apparatus as claimed in claim 6 wherein:
said tire lever means comprises a blade member extending from each of said gripper cylinders in the direction of projection of said gripper piston rod; and
said gripper member comprises a projection on said tire lever member projecting in a direction substantially transverse to the direction of movement of said gripper piston rod.

8. An apparatus as claimed in claim 4 wherein:
said gripper cylinder-piston means are mounted on a respective leg member so that the gripper piston rods thereof move relatively to said gripper cylinders in a direction transverse to the first direction of movement of said gripper means.

9. An apparatus as claimed in claim 8 wherein:
a slot is provided through each leg member; and
said link members each extend through a respective one of said slots.

10. An apparatus as claimed in claim 8 wherein:
said tire lever means comprises a blade member extending from each of said gripper cylinders in the direction of projection of said gripper piston rod; and
said gripper member comprises a projection on said tire lever member projecting in a direction substantially transverse to the direction of movement of said gripper piston rod.

11. An apparatus as claimed in claim 10 wherein:
a slot is provided through each leg member; and
said link members each extend through a respective one of said slots.

12. An apparatus as claimed in claim 11 wherein:
said main cylinder-piston means and gripper cylinder-piston means are operated by pneumatic pressure;
said control means comprises a control valve mounted on said main cylinder for connection to a pressure source; and
pressure lines are connected between said control valve and said main cylinder and gripper cylinders.

13. An apparatus as claimed in claim 2 wherein:
said main piston-cylinder means and gripper piston-cylinder means are operated by pneumatic pressure;
said control means comprises a control valve mounted on said main cylinder-piston means for connection to a pressure source; and
pressure lines are connected between said control valve and said main cylinder-piston means and gripper cylinders.

14. An apparatus as claimed in claim 2 wherein said main actuating means further comprises:
two leg members each pivotally mounted in relative spaced relation on the cylinder of said main cylinder-piston means;
one of said gripper means being mounted on each of said leg members in spaced relation to the pivotal mounting thereof;
an outer end said main piston rod; and
a toggle-link mechanism between the outer end of said main piston rod and said leg members.

* * * * *